UNITED STATES PATENT OFFICE.

CHARLES SIMON, OF BASLE, SWITZERLAND, ASSIGNOR TO JOHN R. GEIGY & CO., OF SAME PLACE.

GREEN TRISAZO DYE AND PROCESS OF MAKING SAME.

SPECIFICATION forming part of Letters Patent No. 628,233, dated July 4, 1899.

Application filed March 27, 1899. Serial No. 710,693. (Specimens.)

*To all whom it may concern:*

Be it known that I, CHARLES SIMON, Ph. D., a citizen of the Republic of Switzerland, residing in Basle, in the Republic of Switzerland, have invented certain new and useful Improvements in Processes of Producing Green Trisazo Colors, of which the following is a specification.

This invention relates to the production of new green trisazo colors which are obtained by the reaction of diazotized orthochloroparanitranilin upon $alpha_1$ $alpha_4$ amidonaphtol $beta_2$ $beta_3$ disulfoacid, and the further combination of one molecule of the resulting monoazo compound with one molecule of a tetrazo compound, such as tetrazodiphenyl, tetrazoditolyl, tetrazodiphenolether, and one molecule of a phenol, such as phenol, orthocresol, salicylic acid, or orthocresotinic acid.

The new green coloring-matters have the following formula:

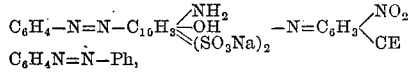

wherein Ph signifies phenol and its above-mentioned derivatives.

Example I: 17.25 kilograms of orthochloroparanitranilin are dissolved in sixty kilograms of concentrated sulfuric acid at a temperature of 120° centigrade. Then the solution is poured into one hundred kilograms of ice and diazotized with seven kilograms of nitrite of sodium. The diazo compound is then permitted to run into a solution of thirty-two kilograms of $alpha_1$ $alpha_4$ amidonaphtol $beta_2$ $beta_3$ disulfoacid with 10.6 kilograms of carbonate of sodium in five hundred liters of water. After stirring for some hours the monoazo compound is combined with a solution of tetrazodiphenyl obtained from 18.4 kilograms of benzidin in the well-known manner, which is first added with fifty kilograms of carbonate of sodium. Thus an intermediary compound is formed as a black precipitate. Then a solution of 9.4 kilograms of phenol with five kilograms of caustic soda in one hundred liters of water is added and the whole mass heated to the boiling-point. Then the coloring-matter is precipitated by common salt, filtered, pressed, and dried.

Example II: 21.5 kilograms of tolidin are tetrazotized in the well-known manner, then added with fifty kilograms of carbonate of sodium and with 14.5 kilograms of salicylic acid, dissolved with six kilograms of carbonate of sodium in one hundred liters of water. After some hours the formation of the intermediary compound being finished, a solution of fifty kilograms of the azo compound ortho-chloroparanitranilin-azo-$alpha_1$-$alpha_4$-amido-naphtol-$beta_2$-$beta_3$ disulfoacid (obtained as described in Example I) is added and the process then further continued as in Example I.

The new coloring-matter is a dark greenish-grey powder, easily soluble in water with a dark-green color and soluble in concentrated sulfuric acid with a blue color. It is scarcely soluble in alcohol, and insoluble in benzene and ether. It dyes unmordanted cotton and mixed goods, as half-woolen or half-silk, in green shades fast to light, acids, and soap.

Having thus described my invention, I claim as new and desire to secure by Letters Patent—

1. The herein-described process of producing green coloring-matters, which consists in combining one molecule of the monoazo color, obtained from diazotized orthochloro-paranitranilin and $alpha_1$-$alpha_4$-amidonaphtol $beta_2$ $beta_3$ disulfoacid, with one molecule of a tetrazo compound and one molecule of a phenol compound, substantially as set forth.

2. The green coloring-matter produced by combining the monoazo color, obtained from diazotized ortho-chloro-paranitranilin and $alpha_1$-$alpha_4$-amidonaphtol $beta_2$ $beta_3$ disulfoacid, with one molecule of tetrazodiphenyl and one molecule of salicylic acid, the same being a dark greenish-gray powder, soluble in water with a green color, soluble in concentrated sulfuric acid with a blue color, scarcely soluble in alcohol, insoluble in ether and benzene and dyeing unmordanted cotton in green shades, substantially as set forth.

In testimony that I claim the foregoing as my invention I have signed my name in presence of two subscribing witnesses.

CHARLES SIMON.

Witnesses:
GEORGE GIFFORD,
ALBERT GRAETER.